US011055959B2

(12) United States Patent
Baerlocher et al.

(10) Patent No.: US 11,055,959 B2
(45) Date of Patent: Jul. 6, 2021

(54) DEVICE-TO-DEVICE TRANSFER OF WAGERING GAME OBJECTS

(71) Applicant: SG Gaming, Inc., Las Vegas, NV (US)

(72) Inventors: Anthony J. Baerlocher, Henderson, NV (US); Dion K. Aoki, Chicago, IL (US); Larry J. Pacey, Northbrook, IL (US); Jesse M. Smith, Chicago, IL (US); Jamie W. Vann, Chicago, IL (US)

(73) Assignee: SG Gaming, Inc., Las Vegas, NV (US)

( * ) Notice: Subject to any disclaimer, the term of this patent is extended or adjusted under 35 U.S.C. 154(b) by 1154 days.

(21) Appl. No.: 14/292,951

(22) Filed: Jun. 2, 2014

(65) Prior Publication Data

US 2014/0364199 A1 Dec. 11, 2014

Related U.S. Application Data

(60) Provisional application No. 61/832,271, filed on Jun. 7, 2013.

(51) Int. Cl.

| | |
|---|---|
| ***A63F 9/24*** | (2006.01) |
| ***A63F 13/00*** | (2014.01) |
| ***G06F 17/00*** | (2019.01) |
| ***G07F 17/32*** | (2006.01) |

(52) U.S. Cl.

CPC ...... *G07F 17/3244* (2013.01); *G07F 17/3225* (2013.01)

(58) Field of Classification Search

CPC ............. G07F 17/3204; G07F 17/3218; G07F 17/3225; G07F 17/3227

See application file for complete search history.

(56) References Cited

U.S. PATENT DOCUMENTS

| | | | | |
|---|---|---|---|---|
| 6,702,672 | B1 * | 3/2004 | Angell | A63F 3/081 463/25 |
| 8,430,745 | B2 | 4/2013 | Agarwal et al. | |
| 8,649,314 | B2 | 2/2014 | Lin | |
| 8,668,565 | B2 | 3/2014 | Ansari et al. | |
| 2003/0064805 | A1 * | 4/2003 | Wells | G07F 17/32 463/39 |
| 2004/0023709 | A1 * | 2/2004 | Beaulieu | G07F 17/323 463/16 |

(Continued)

FOREIGN PATENT DOCUMENTS

| | | |
|---|---|---|
| WO | 2010083486 | 7/2010 |
| WO | 2012112602 | 8/2012 |

*Primary Examiner* — Kang Hu
*Assistant Examiner* — Jason Pinheiro

(57) ABSTRACT

A method for transferring a wagering game object, monetary value, and/or non-monetary value between a mobile device and a second device is described herein. In some embodiments, the method can include presenting, on a mobile device, a graphical user interface configured to receive user input. The method can further include receiving, via the graphical user interface, a gesture that initiates transfer of one or more of a wagering game object, monetary value, and non-monetary value between the mobile device and a second device. The method can further include transmitting, via a network in response to the gesture, one or more of the wagering game object, the monetary value, and the non-monetary value between the mobile device and the second device.

10 Claims, 12 Drawing Sheets

(56) References Cited

U.S. PATENT DOCUMENTS

| | | | | |
|---|---|---|---|---|
| 2007/0155509 | A1* | 7/2007 | Wiltshire | A63F 3/081 463/42 |
| 2007/0197283 | A1* | 8/2007 | Hartwell | G07F 17/32 463/29 |
| 2008/0039212 | A1* | 2/2008 | Ahlgren | H04M 1/7253 463/46 |
| 2011/0183749 | A1* | 7/2011 | Allen | G06Q 30/02 463/25 |
| 2013/0130777 | A1 | 5/2013 | Lemay et al. | |
| 2013/0130778 | A1 | 5/2013 | Anderson et al. | |
| 2013/0203481 | A1 | 8/2013 | Miller | |
| 2013/0260861 | A1* | 10/2013 | Vann | G07F 17/34 463/20 |
| 2012/0337890 | | 12/2013 | Earley et al. | |
| 2014/0038141 | A1 | 2/2014 | Burza et al. | |
| 2014/0051500 | A1 | 2/2014 | Anderson et al. | |
| 2014/0094273 | A1 | 4/2014 | Nguyen | |
| 2014/0152894 | A1* | 6/2014 | Childs | H04N 5/76 348/552 |

* cited by examiner

DEVICE-TO-DEVICE TRANSFER OF WAGERING GAME OBJECTS

RELATED APPLICATIONS

This application claims the priority benefit of U.S. Provisional Application Ser. No. 61/832,271 filed Jun. 7, 2013.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

FIELD

Embodiments of the inventive subject matter relate generally to wagering game systems, and more particularly to wagering game systems including transmissions between mobile devices and mobile devices and wagering game machines.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Introduction

This section provides an introduction to some embodiments of the invention.

Typically, players must be seated at a wagering game machine or table game to participate in a wagering game. This can be time consuming, and may limit the number of players that can play the wagering game to the physical number of positions available at the wagering game machine or table game. Some embodiments of the invention allow players to participate in wagering games using a mobile device. Additionally, in some embodiments, players can transfer wagering game objects, monetary value, non-monetary value, etc. between a first mobile device and a second mobile device, and between a mobile device and a wagering game machine.

Figure 1:
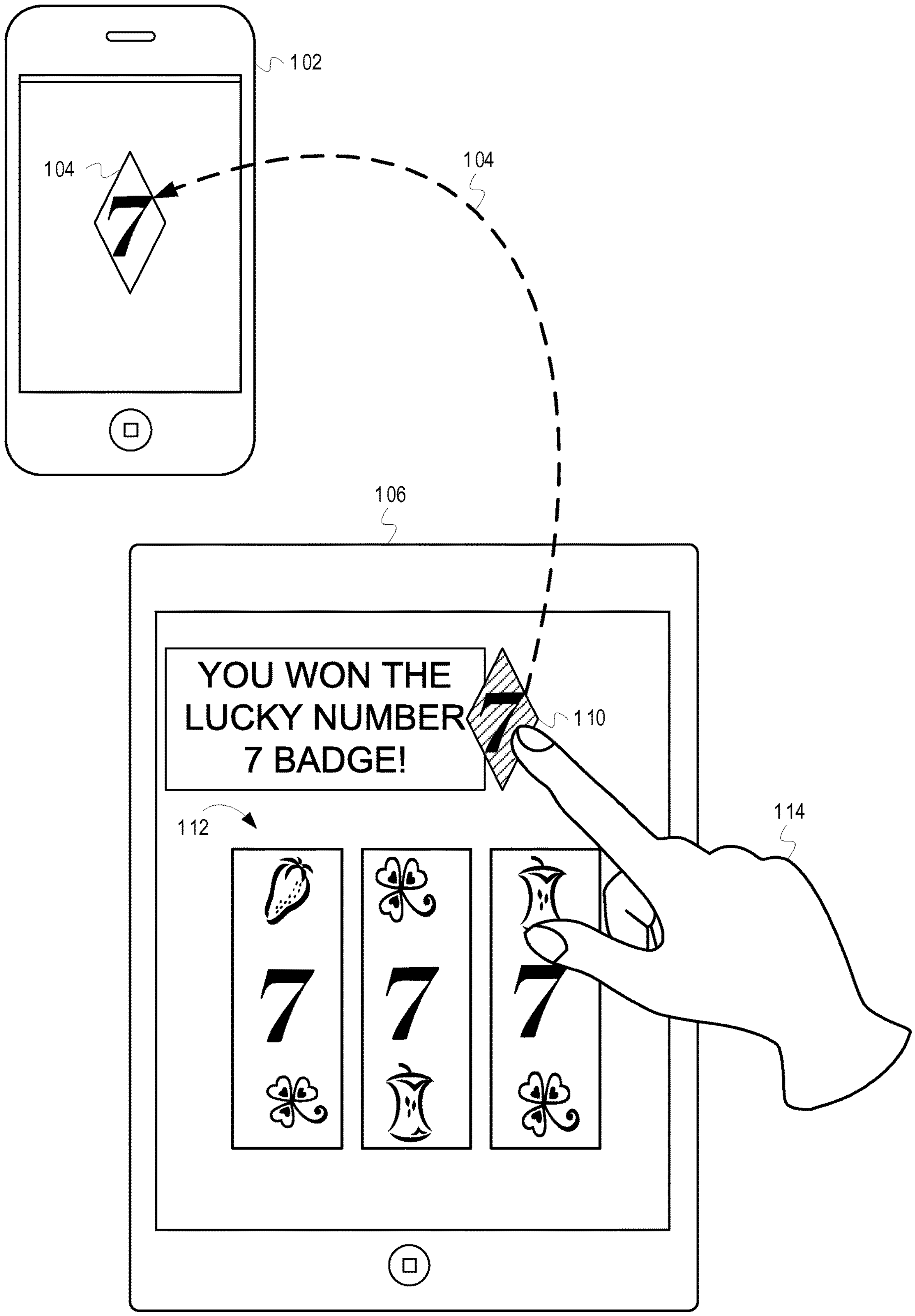
FIG. 1 depicts transfer of a wagering game object 110 from a first mobile device 106 to a second mobile device 102.

FIG. 1 depicts transfer of a wagering game object 110 from a first mobile device 106 to a second mobile device 102. In some embodiments, players can transfer wagering game objects, monetary value, etc. from one mobile device to another mobile device. As depicted in FIG. 1, a player 114 is playing a virtual slot game 112 on the first mobile device 106. The player 114 is transferring a wagering game object 110 from the first mobile device 106 (a tablet computer) to a second mobile device 102 (a mobile phone). Because the player achieved a slot game outcome of three "7s," the player 114 has won the "Lucky Number 7 Badge" (i.e., the wagering game object 110). As depicted, the wagering game object 110 includes hash marks on the first mobile device 106, as the player 114 has selected the wagering game object 110 for transfer. The player 114 then performs a gesture to transfer the wagering game object 110 to the second mobile device 102, as indicated by arrow 104. For example, the gesture can be a flick, where the player 114 places a finger on the wagering game object 110, then proceeds to slide his/her finger across a touchscreen of the first mobile device 106 toward the second mobile device 102, releasing his/her finger as his/her finger nears the edge of the touchscreen. The motion of the player's finger and touchscreen contact points can vary according to embodiments. After performing the gesture, the wagering game object 104 resides on the second mobile device 102.

In some embodiments, the first mobile device and the second mobile device can be associated with the same player account. Alternatively, in some embodiments, the first mobile device and the second mobile device can be associated with distinct player accounts. In other words, a first player can transfer the wagering game object to a second player. Additionally, in some embodiments, players can transfer anything related to the wagering game. For example, in some embodiments, a first player can transfer monetary value, non-monetary value, achievements, unlocked levels of wagering games, etc. to a second player. Additionally, in some embodiments, players can send virtual gifts to other players' mobile devices. Embodiments can employ different gestures to facilitate the transfer. For example, the player can "flick" the wagering game object from their mobile device to the second mobile device, the player can drag the wagering game object to a designated area, press and hold the wagering game object, etc. Additional gestures can includes, for example, a pinch, a drag, a tap, a multiple tap, a multiple touch input, etc.

In some embodiments, the first mobile device and the second mobile device can be communicatively coupled to one another. For example, the mobile devices can communicate via a Wi-Fi network, a cellular network, Bluetooth or other near field communication network, etc. Alternatively, in some embodiments, the mobile devices can be connected via a cable.

Figure 2:
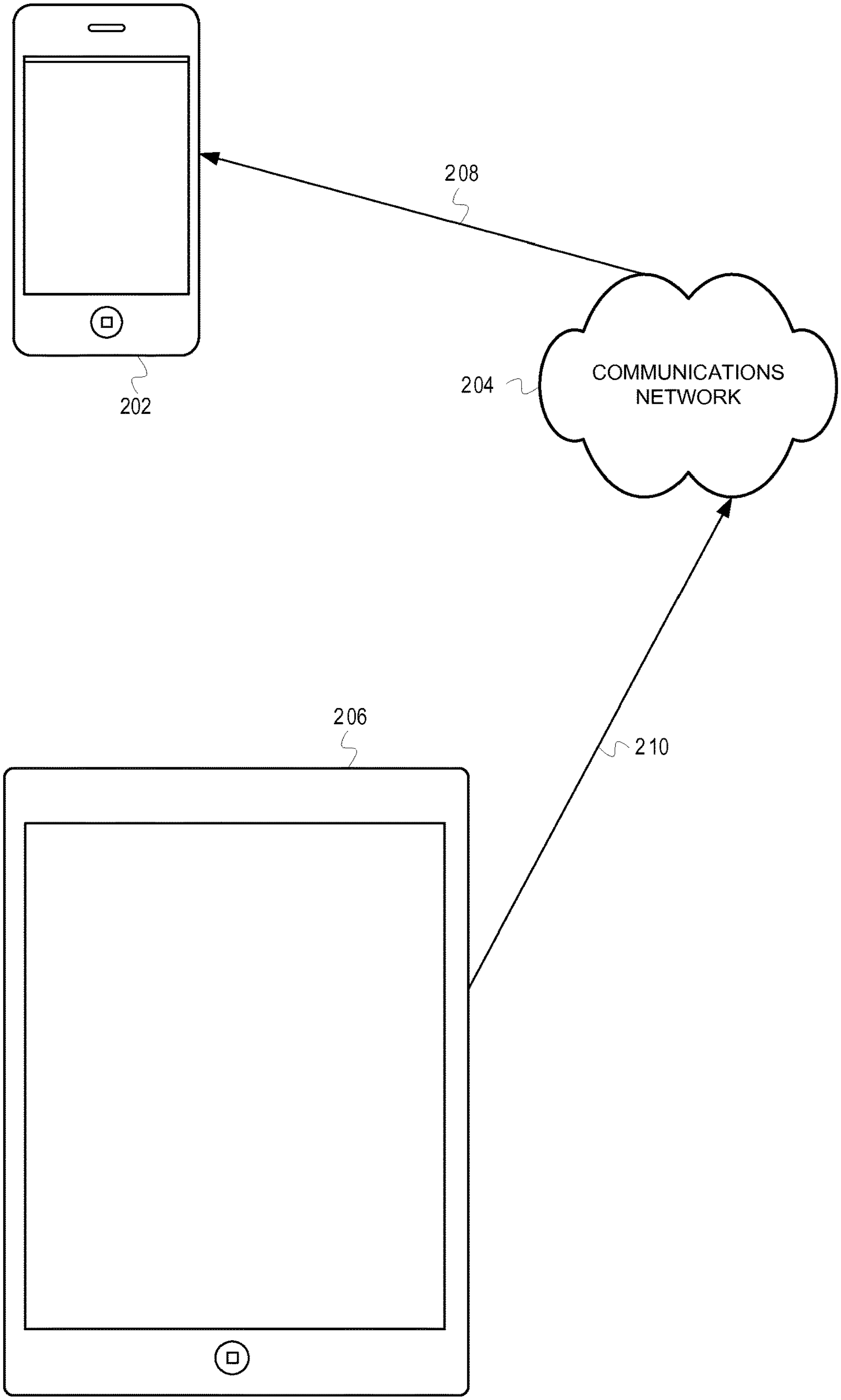
FIG. 2 depicts example communications between a first mobile device 202 and a second mobile device 206.

While FIG. 1 depicts transferring a wagering game object from a first mobile device to a second mobile device, FIG. 2 depicts example communications to facilitate this transfer.

FIG. 2 depicts example communications between a first mobile device 202 and a second mobile device 206. The two mobile devices can interact via any suitable communications network. In some embodiments, the two devices can interact directly with one another, such as via Bluetooth or other suitable near-field communications technologies. However, some embodiments can employ wireless telephone networks. In FIG. 2, the communication channel proceeds from the second mobile device 206 to a communications network (e.g., a 3G network, a 4G network, a Wi-Fi network, etc.) (see arrow 210), and on to the first mobile device 202 (see arrow 206).

In some embodiments, the communications network 204 can include a server or device to facilitate the transfer between devices. For example, the mobile devices can connect to a Wi-Fi network within a casino. The communication from the second mobile device 206 can be routed to a server (e.g., a wagering game server) that facilitates the transfer from the second mobile device 206 to the first mobile device 202. Additionally, in some embodiments, the two mobile devices need not be within the same casino or even in close proximity to one another. For example, the second mobile device 206 can be in a first geographic area (e.g., a city, state, country, etc.) and the second mobile device 202 can be in a second geographic area. As a result, embodiments enable a player to transfer wagering game objects (or anything else related to the wagering game as described above) from the second mobile device 206 to the first mobile device 202.

Figure 3:
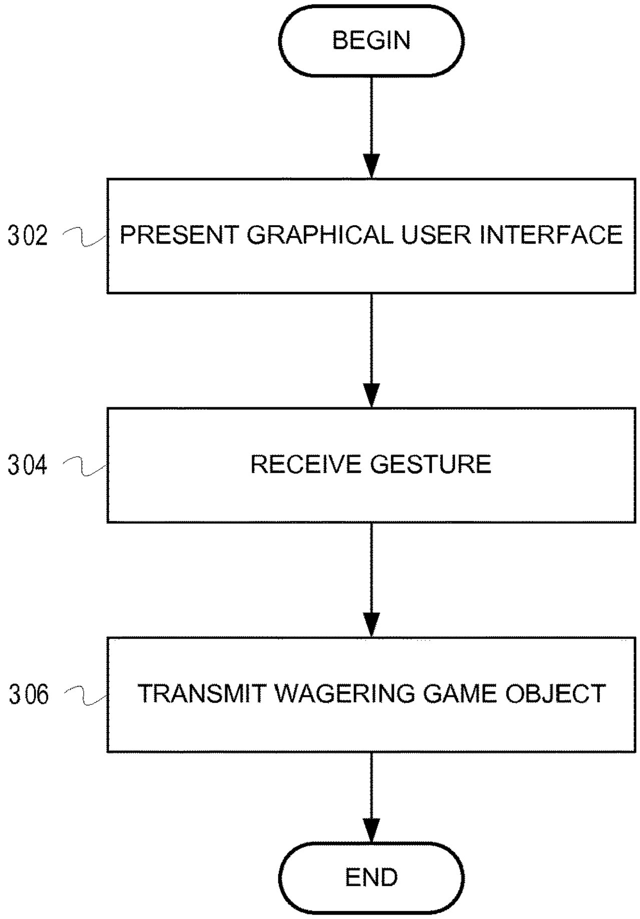
FIG. 3 is a flow diagram illustrating example operations for transfer of a wagering game object between a first mobile device and a second device.

While FIG. 2 depicts example communications to facilitate the transfer of wagering game objects from a first mobile device to a second mobile device, FIG. 3 is a flow diagram illustrating example operations for this transfer.

FIG. 3 is a flow diagram illustrating example operations for transfer of a wagering game object between a first mobile device and a second device. The flow begins at block 302.

At block 302, a mobile device presents a graphical user interface (GUI) to a player. In some embodiments, the mobile device can include a touchscreen, and the mobile device can present the GUI and receive player input in the form of a gesture via the GUI on the touchscreen. In some embodiments, the GUI can be associated with a dedicated application. For example, the mobile device can run an application developed for a casino or social gaming website. In other embodiments, the GUI can be associated with a webpage. In such embodiments, the player navigates to a website associated with the casino, social gaming website, etc. to use the GUI. The flow continues at block 304.

At block 304, the mobile device receives a gesture via the GUI. As previously discussed (see discussion of FIG. 1), the gesture can be any player input suitable for facilitating a transfer of wagering game objects from the mobile device. For example, the player can perform a flick, or any other gesture, such as a double-tap gesture, on the wagering game object to transfer the wagering game object from their mobile device to a friend's mobile device. The flow continues at block 306.

At block 306, the mobile device transmits the wagering game object in response to the gesture. In some embodiments, when a wagering game object is transferred from a first mobile device to a second mobile device, a copy of the wagering game object is made, so that the wagering game object resides on both the first mobile device and the second mobile device. In other embodiments, when the wagering game object is transferred from the first mobile device to the second mobile device, the wagering game object no longer resides on the first mobile device, and resides only on the second mobile device. Additionally, the mobile device can transfer the wagering game object via any suitable means (i.e., a Wi-Fi network, a cellular network, an NFC network, etc.). As previously noted, the mobile device can transfer anything relating to wagering games.

While FIGS. 1-3 describe transferring a wagering game object from a first mobile device to a second mobile device, FIGS. 4-9 describe transferring wagering game objects between a mobile device and a wagering game machine.

Figure 4:
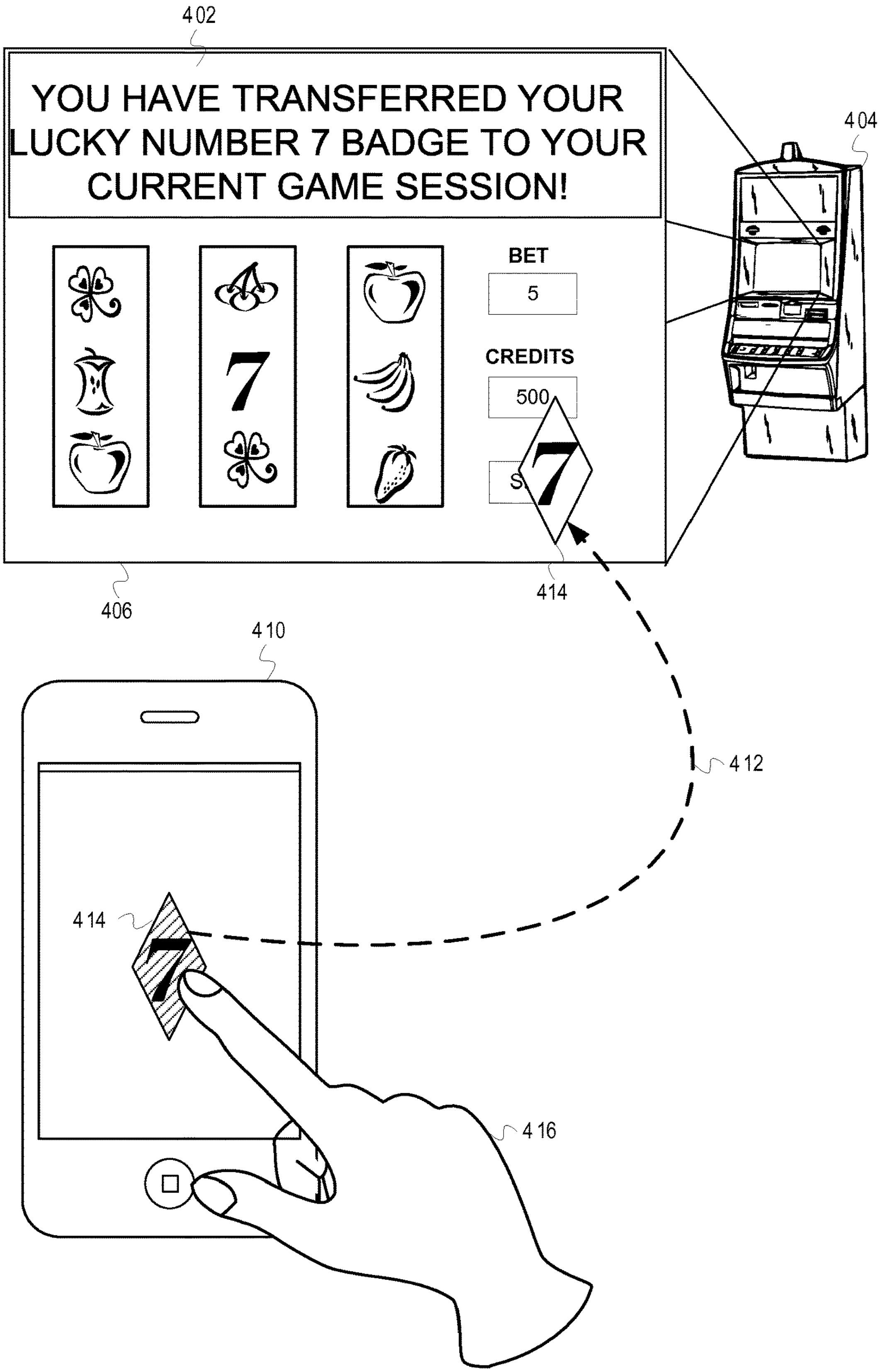
FIG. 4 depicts transfer of a wagering game object 414 from a mobile device 410 to a wagering game machine 404.

FIG. 4 depicts transfer of a wagering game object 414 from a mobile device 410 to a wagering game machine 404. As previously discussed (see discussion of FIGS. 1-3), wagering game objects (as well as monetary value, non-monetary value, etc.) can be transferred from a first mobile device to a second mobile device. In some embodiments, wagering game objects (as well as monetary value, non-monetary value, etc.) can be transferred from a mobile device to a wagering game machine, or from a wagering game machine to a mobile device. As depicted in FIG. 4 a player 416 is transferring the "Lucky Number 7 Badge" 414 from the mobile device 410 to the wagering game machine 404. For example, the player 416 may have won the badge 414 while playing a slots wagering game on a gaming website via the mobile device 410. Alternatively, the player 416 may have won the badge playing a slots game on a wagering game machine. The player 416 can then transfer the badge 414 to the wagering game machine 404, so the badge 414 may be used during wagering game play on the wagering game machine 404.

FIG. 4 depicts a wagering game machine 404 and an expanded view of the wagering game machine display device 406. Presented on the wagering game machine display device 406 is a slots type wagering game. The player 416 has selected the badge 414 (as indicated by hashing on the mobile device 410) for transfer to the wagering game machine 404. The player performs a gesture (e.g., a flick, swipe, etc.) to initiate the transfer of the badge 414 from the mobile device 410 to the wagering game machine 404. After the transfer is complete, the display device of the wagering game machine 406 presents the badge 414 along with a message 402 acknowledging the transfer.

As with transfers between mobile devices, transfers between a mobile device and a wagering game machine can occur via any suitable communications medium. In some embodiments, the mobile device communicates directly with the wagering game machine via a communications network (a Wi-Fi network, cellular network, etc.). In other embodiments, the mobile device communicates first with a server (e.g., a wagering game server), and the server transfers the object to the wagering game machine. In some embodiments, in addition to players transferring wagering game objects, etc. from a mobile device to a wagering game machine, players can transfer wagering game objects, etc. from a wagering game machine to a mobile device. For example, a player can win an award (e.g., badge, credits, etc.) playing a wagering game on a wagering game machine, then transfer the award to a mobile device for subsequent use on another wagering game machine, subsequent wagering game play on a social gaming website, etc.

Figure 5:
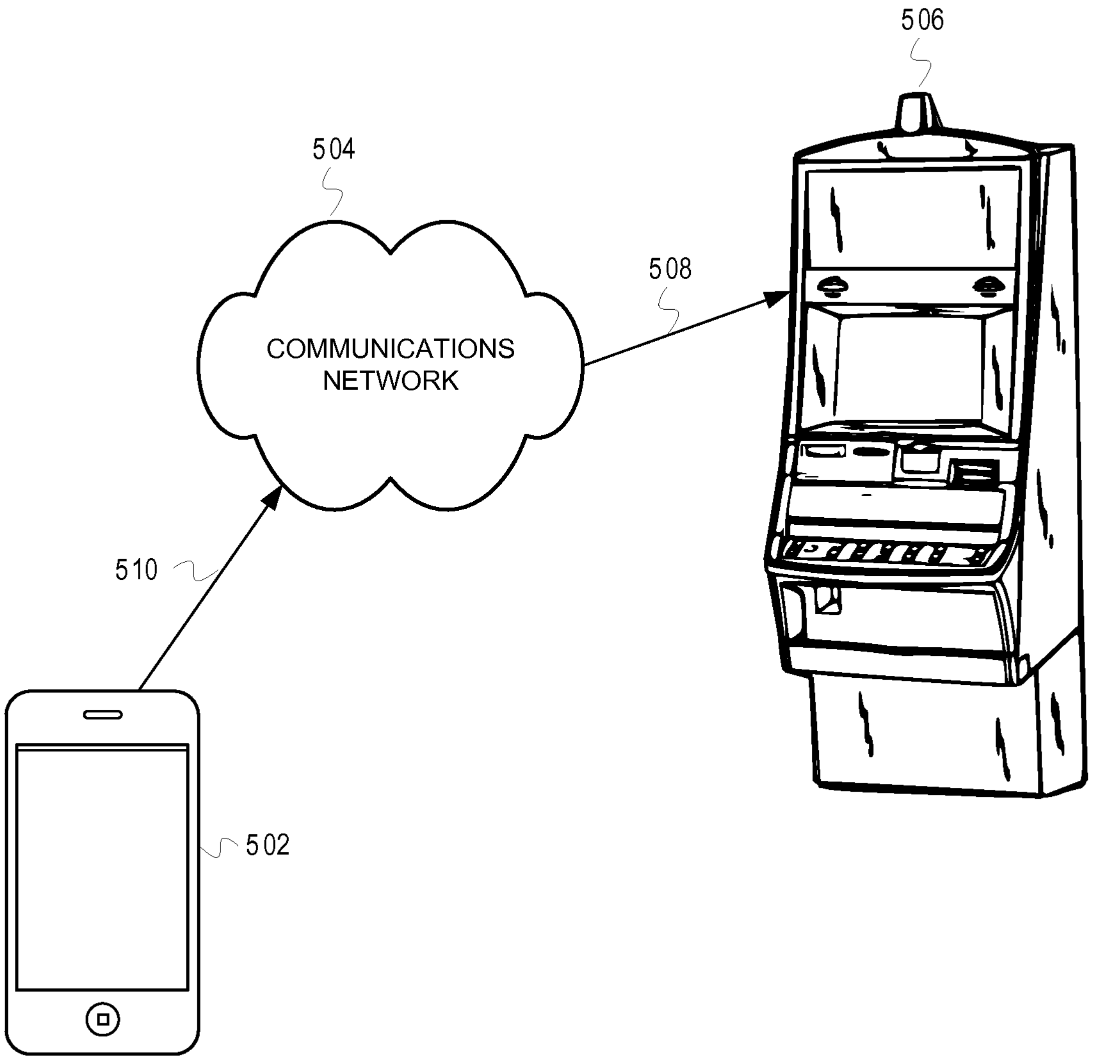
FIG. 5 depicts example communications between a mobile device 502 and a wagering game machine 506.

FIG. 5 depicts example communications between a mobile device 502 and a wagering game machine 506. The mobile device 502 communicates with the wagering game machine via a communications network 504, as depicted by arrows 508 and 510. As previously discussed (see discussion of FIGS. 1 and 4), the communication can include transfer of a wagering game object, monetary value, etc. from the mobile device 502 to the wagering game machine 506 and vice versa. The communications network 504 can take the form of any suitable medium. For example, the mobile device 502 can communicate directly with the wagering game machine 506 via a Wi-Fi network, an NFC network, a cellular network, etc. In such embodiments, the mobile device 502 can associate with the wagering game machine 506 using a unique identifier, scanning a quick response code, etc. Additionally, the mobile device's 502 image capture device can be used in concert with optical recognition software to associate the mobile device 502 with the wagering game machine 506. In some embodiments, the mobile device 502 can communicate with the wagering game machine 506 indirectly. For example, the mobile device 502 can communicate with a wagering game server, which in turn, communicates with the wagering game machine 506.

Figure 6:
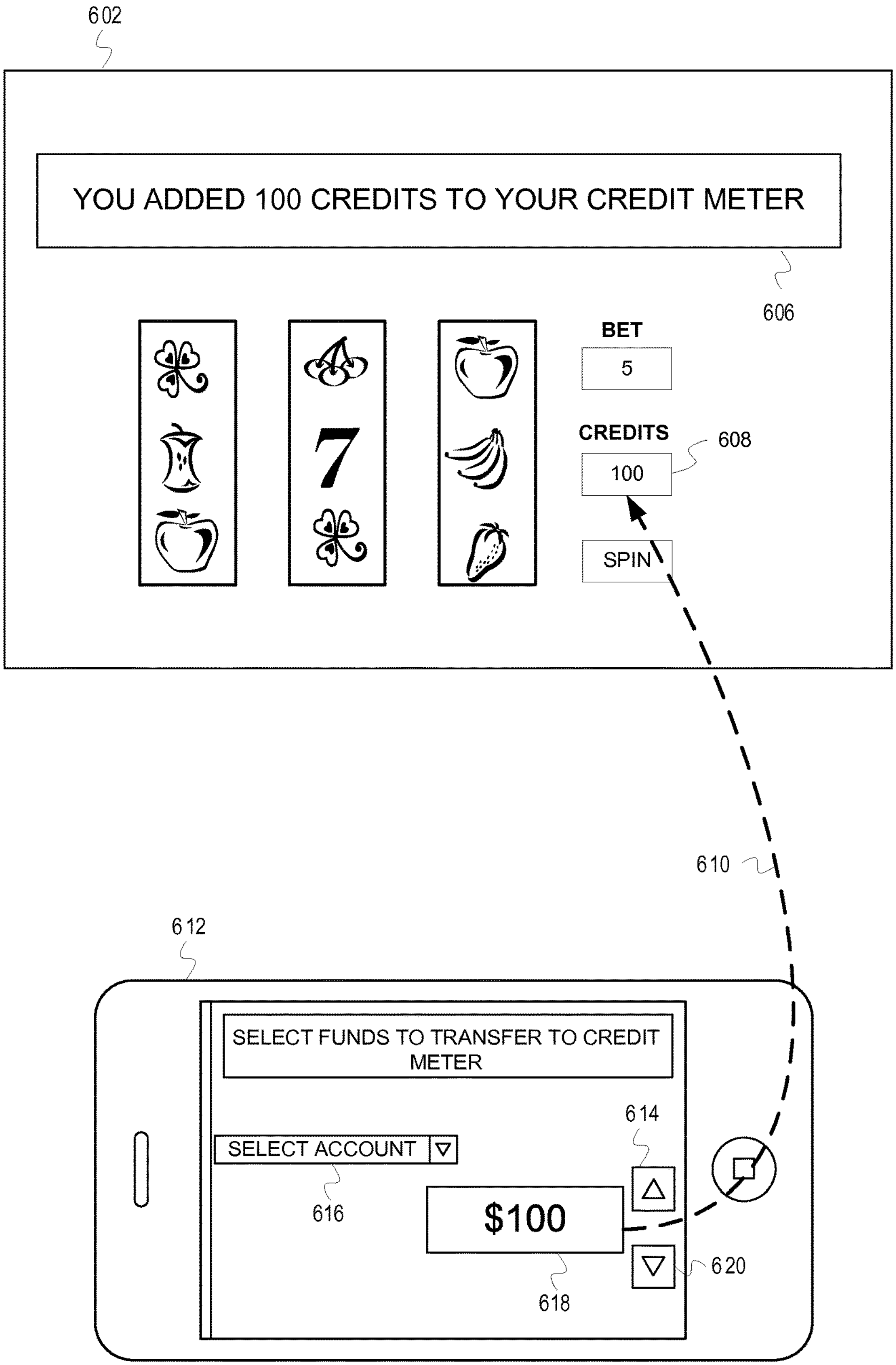
FIG. 6 depicts transferring funds to a wagering game machine via a mobile device 612, as indicated by arrow 610.

FIG. 6 depicts transferring funds to a wagering game machine via a mobile device 612, as indicated by arrow 610. In some embodiments, the mobile device 612 can include a virtual wallet. In such embodiments, a player can transfer funds from the virtual wallet to the wagering game machine. The player can perform a gesture on the mobile device 612 to facilitate this transaction. For example, the player can select an account from which to transfer funds using a menu 616. The player can select an amount to transfer using the increase and decrease buttons 614 and 620. Additionally, the user can use a more complicated gesture to select and amount to transfer. For example, the player can press and hold the transfer amount indicator 618 with the player's finger. As the player holds the transfer amount indicator 618, the amount to transfer can increase. When the desired value is displayed on the transfer amount indicator 618, the player can swipe, flick, etc. the transfer amount indicator 618 to the wagering game machine. When the transfer is complete, a display device 602 of the wagering game machine can present the amount transferred on a credit meter 608. Additionally, the wagering game machine can present a confirmation message, such as confirmation message 606 stating that the player has added 100 credits ($100, etc.) to the credit meter. Additionally, in some embodiments, a player can place bets in a similar fashion (as will be described in greater detail in the discussion of FIG. 7). For example, a player can select a bet amount and place the bet via the mobile device 612.

In some embodiments, players can transfer funds directly from a bank account onto a wagering game machine for wagering gameplay. In such embodiments, the mobile device can communicate with a server associated with the bank account to withdraw funds. The mobile device can then associate with the wagering game machine to which the funds are to be transferred. The player can then perform a touchscreen gesture to transfer the funds to the wagering game machine. In other embodiments, the player can first transfer funds from a bank account to a casino account before transferring the funds to the wagering game machine.

Although the discussion of FIG. 6 refers to transferring funds from a mobile device to a wagering game machine, in some embodiments, players can transfer funds from the wagering game machine to their mobile device. For example, when a player wishes to cash out, the player can perform one or more touchscreen gestures on the mobile device and/or wagering game machine to transfer a credit balance from the wagering game machine to the player's mobile device. The player can then deposit a monetary value associated with the credit balance using the mobile device in an account. Alternatively, the player can proceed to a second wagering game machine and transfer the credit balance from their mobile device to the second wagering game to play wagering games on the second wagering game machine.

In addition to transferring funds between a wagering game machine and a mobile device, in some embodiments, players can transfer a credit meter (or other portions of a wagering game) from the wagering game machine to their mobile device. For example, a player may not wish to have the credit meter displayed on the wagering game machine. The player can perform a touchscreen gesture on the mobile device and/or wagering game machine to transfer the credit meter to the mobile device, so that the credit meter is presented only on the mobile device. Alternatively, the player can perform a gesture so that credit meter is presented on both the wagering game machine and the mobile device. As another example, the player can transfer a live-updating credit meter for a progressive jackpot to their mobile device. This can allow the player to monitor the credit meter for the progressive jackpot even when they are away from the wagering game machines hosting the progressive jackpot.

Figure 7:
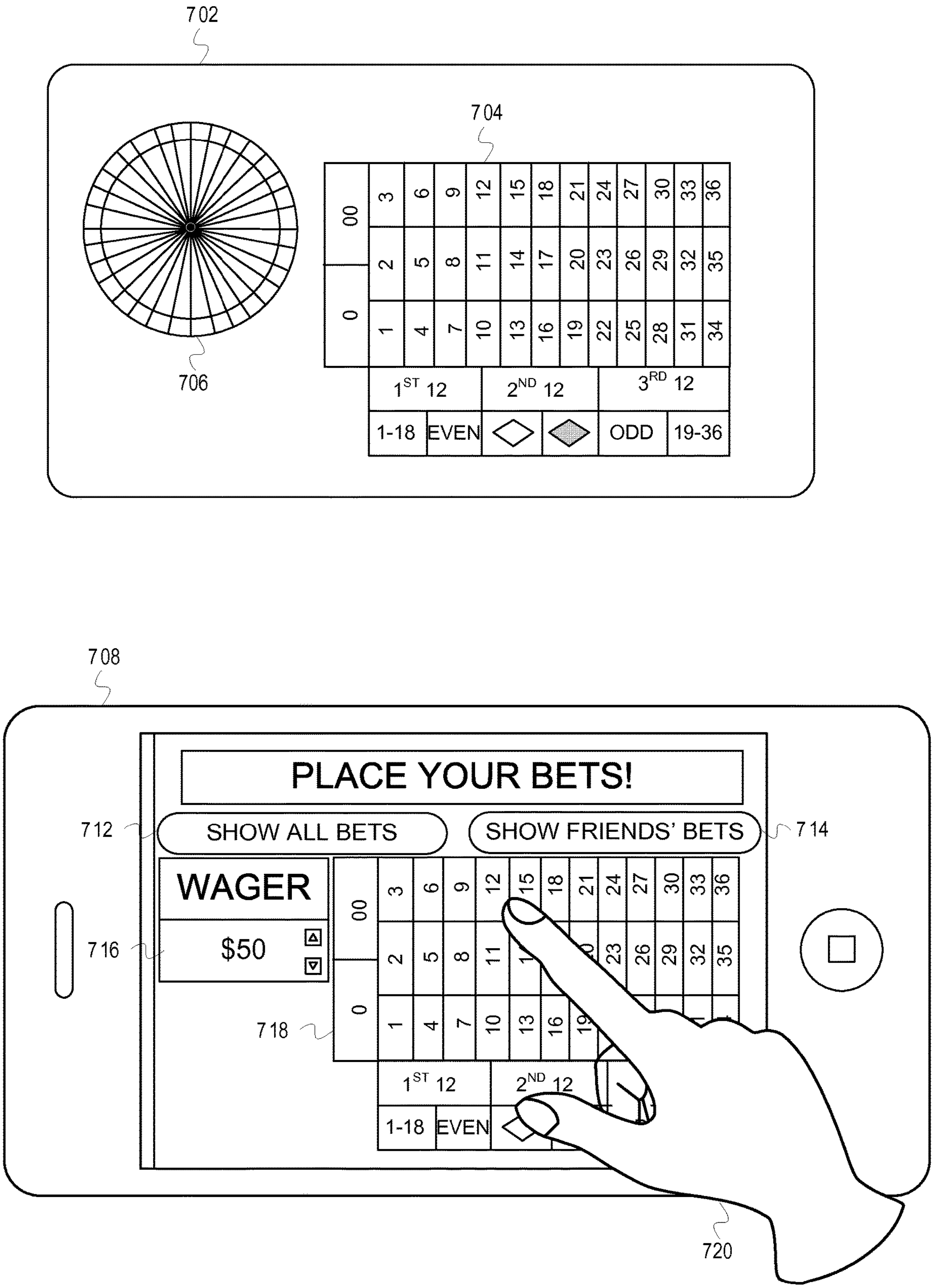
FIG. 7 depicts placing bets for a wagering game via a mobile device 708.

FIG. 7 depicts placing bets for a wagering game via a mobile device 708. In some embodiments, players can place bets via gesturing on the mobile device 708. For example, as depicted in FIG. 7 a player 720 is participating in a roulette game on a roulette table 702. The roulette table 702 includes a roulette wheel 706 and a playfield 704. The mobile device 708 presents an image of a playfield 718, on which the player 720 can place a bet. Additionally, the mobile device includes a wager selection menu 716 with which the player 720 can select a wager amount. In addition to manually placing bets, in some embodiments, the player 720 can preselect a default bet, then quickly place the default bet using a gesture. For example, a player may frequently place inside bets including corner bets of $10 each for 2, 3, 5, and 6 and 19, 20, 22, and 23. Instead of manually placing the bets for each round, the player can set these as default bets, then perform a gesture to place these bets. Additionally, the player can perform a gesture (e.g., a pinch, etc.) to "zoom in" on the playfield. In some embodiments, the mobile device 708 can also present a "show all bets" button 712 and a "show friends' bets" button 714. Upon selecting the "show all bets" button 712, the mobile device presents an image of the playfield containing virtual chips depicting the bets placed by all players playing the roulette game (bets made with both with physical chips and virtually via mobile devices). Upon selection of the "show friends' bets" button 714, the mobile device presents an image of the playfield containing virtual chips depicting bets placed by friends playing the roulette game. In some embodiments, the mobile device 708 accesses a player's player account information to determine if any of the player's "friends" (a.k.a. social contacts) are playing the roulette game. Additionally, the mobile device 708 can access information from the wagering game (i.e., roulette game), wagering game server, or other devices listing the current bets placed for the roulette game. In such embodiments, the bets placed are logged and recorded by the wagering game, wagering game server, or other device as bets are placed. The mobile device 708 can use this information to present the current bets placed by all players, both with physical chips and via mobile devices, on the playfield 718 presented on the mobile device 708.

In some embodiments, the roulette game is a physical roulette game at a physical table (i.e., a traditional roulette table). In such embodiments, players can place wagers via their mobile device alongside players placing bets physically (i.e., with chips on the playfield). Additionally, in some embodiments, a player can use the mobile device's camera or other image capture device to view an augmented reality depiction of the wagering game. For example, the player can position the mobile device to capture a live feed of the roulette table. The mobile device can present an image of the roulette table, and overlay the image of the roulette table with the player's bets. In some embodiments, the mobile device can also overlay the image with bets that the player's friends have made, bets that other players playing the roulette game have made, etc.

In some embodiments, a wagering game machine (not a table) may present a video version of roulette, where all bets can be made virtually. In other embodiments, the table 702 is an automated table that can automatically generate and present outcomes. Players can place bets via their mobile devices. Additionally, the players' mobile devices can present an augmented reality depiction of the roulette table 702, showing bets placed by the different players. In some embodiments, the wagering game can be partly or entirely virtual (e.g., video poker, video roulette, etc.), as opposed to entirely physical. Additionally, in some embodiments, players can utilize gestures on their mobile device to place side bets with other players. For example, a first player can perform a gesture on their mobile device to initiate a side bet with another player for the roulette game. The first player's mobile device can communicate the side bet to a second player's mobile device. The second player can then perform a gesture on their mobile device to accept, modify, etc. the side bet.

In some embodiments, gestures performed on the mobile device can be dependent upon the orientation of the mobile device. For example, a player can use a mobile device to play a video poker game. When the mobile device is in a vertical orientation, the player can perform gestures to place bets. For example, the player can swipe up to increase a bet amount, swipe down to decrease a bet amount, tap to place the bet, etc. When the mobile device is in a horizontal orientation, the player can perform gestures to play the game. For example, the player can swipe up to select cars to discard, swipe down to draw more cards, etc. Additionally, in some embodiments, the mobile device can be an extension of the wagering game. For example, a player can be sitting at table playing a virtual poker game. When cards are dealt, the mobile device presents the player's cards. When the player positions the mobile device in a plane parallel to that of the surface of the table, the mobile device can present the back of the cards, mimicking the player placing the cards face down on the table. When the player lifts the mobile device and positions it in a plane normal to that of the surface of the table, the mobile device can present the front of the cards, mimicking the player holding the cards in front of himself/herself.

Figure 8:
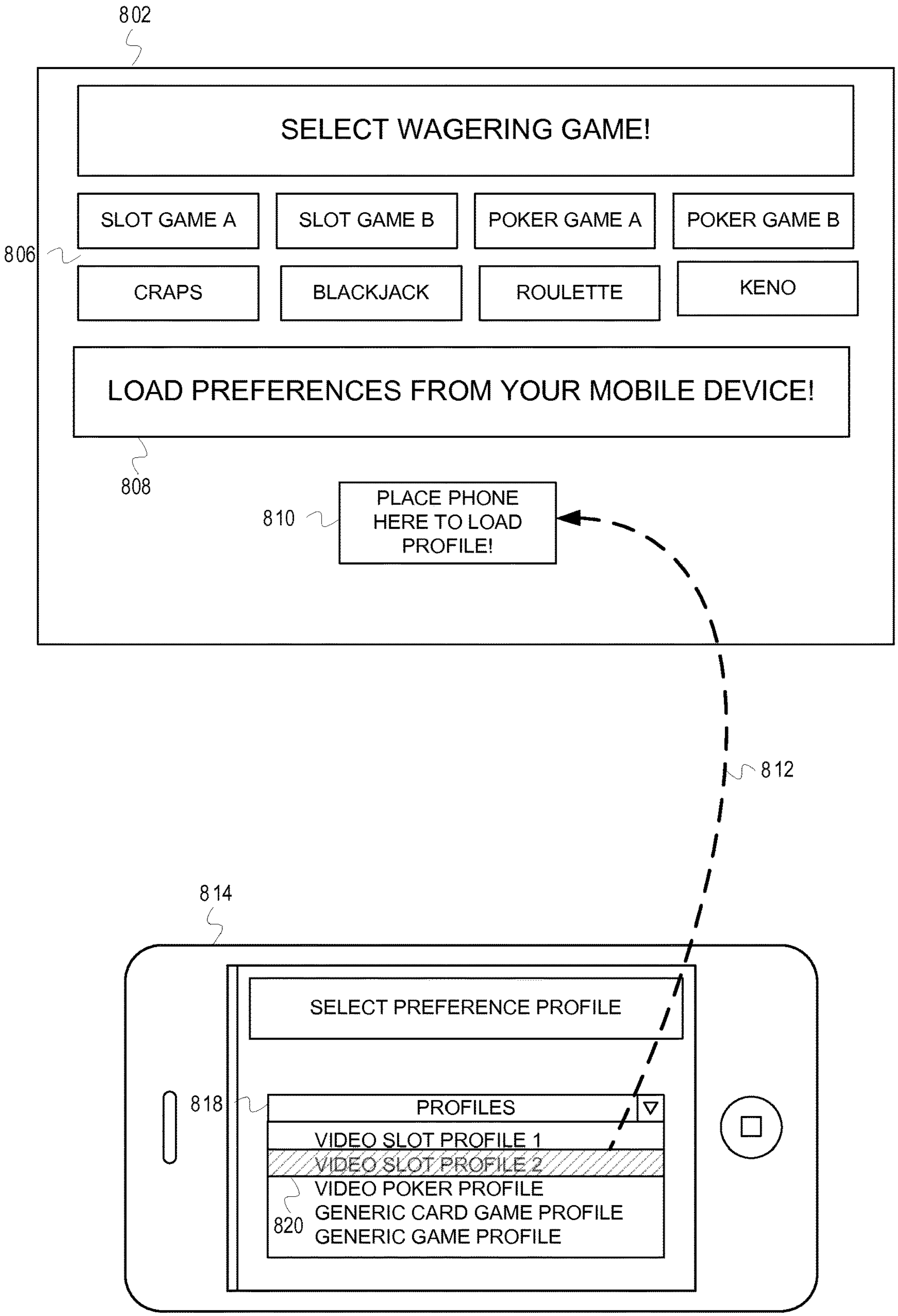
FIG. 8 depicts selecting a preference for a wagering game via a mobile device 814.

FIG. 8 depicts selecting preference for a wagering game via a mobile device 814. In FIG. 8, the wagering game machine 802 is presenting a game selection menu 806 and a load preferences dialogue 808. The player can preconfigure preferences for a variety of wagering games on their mobile device 814. In some embodiments, preferences can include a wagering game theme, a wagering game color theme, wagering game audio themes, wagering game gameplay speed, wagering game payout structure, default bets, a wagering game type, form of complimentaries, etc. In some embodiments, the player can save preference profiles 818 for a variety of wagering games. For example, the player can save a preference profile for multiple slot games, poker games, etc. The player can then easily access the preference profiles and transfer a preference profile to the wagering game machine 802. As depicted in FIG. 8, the player has selected a "video slot profile 2" preference profile 820 to transfer to the wagering game machine 802. In some embodiments, the player can perform a gesture to transfer the preference profile 820 to the wagering game machine, as indicated by arrow 812. For example, the player can select the desired preference profile 820 and swipe or "flick" the preference profile 820 to the wagering game machine 802. In some embodiments, the player can transfer the preference profile 820 by selecting the preference profile 820 and holding the mobile device 814 in proximity to the wagering game machine 802. In some embodiments, the wagering game machine 802 can present a target 810 where the player can hold the mobile device 814 to load the preference profile 820.

In some embodiments, players can link their mobile device to their player account via an application running on the mobile device. In such embodiments, players can set preferences for wagering games via a wagering game machine, a computer, etc., and associate the preferences with their player account. Then, when the player is playing wagering games in a casino, the player can access their preferences via the mobile device, transfer the preferences from their mobile device to a wagering game machine, and then play a wagering game that incorporates their preferences on the wagering game machine. Additionally, in some embodiments, players can set preferences via a wagering game machine, then using a combination of gestures on the mobile device and/or wagering game machine, transfer the preferences to their mobile device for later use. In addition to transferring preferences from a wagering game machine to a mobile device, in some embodiments, players can transfer rounds of a wagering game that have been played from the wagering game to their mobile device. For example, a player may draw a royal flush while playing a virtual poker game. The player can perform a gesture on the mobile device and/or wagering game machine to transfer the round to their mobile device. This transfer can include all information necessary to recreate the round of the wagering game machine. For example, the transfer may include a video recreation of events (i.e., draws, discards, bets, etc.) leading to the royal flush. Although the discussion of FIG. 8 describes transferring preferences between a wagering game machine and a mobile device, in some embodiments, preferences can be transferred between a first mobile device and a second mobile device. Additionally, a single player can own the first mobile device and the second mobile device, or a first player can own the first mobile device and a second player (e.g., one of the first player's social contacts) can own the second mobile device.

Figure 9:
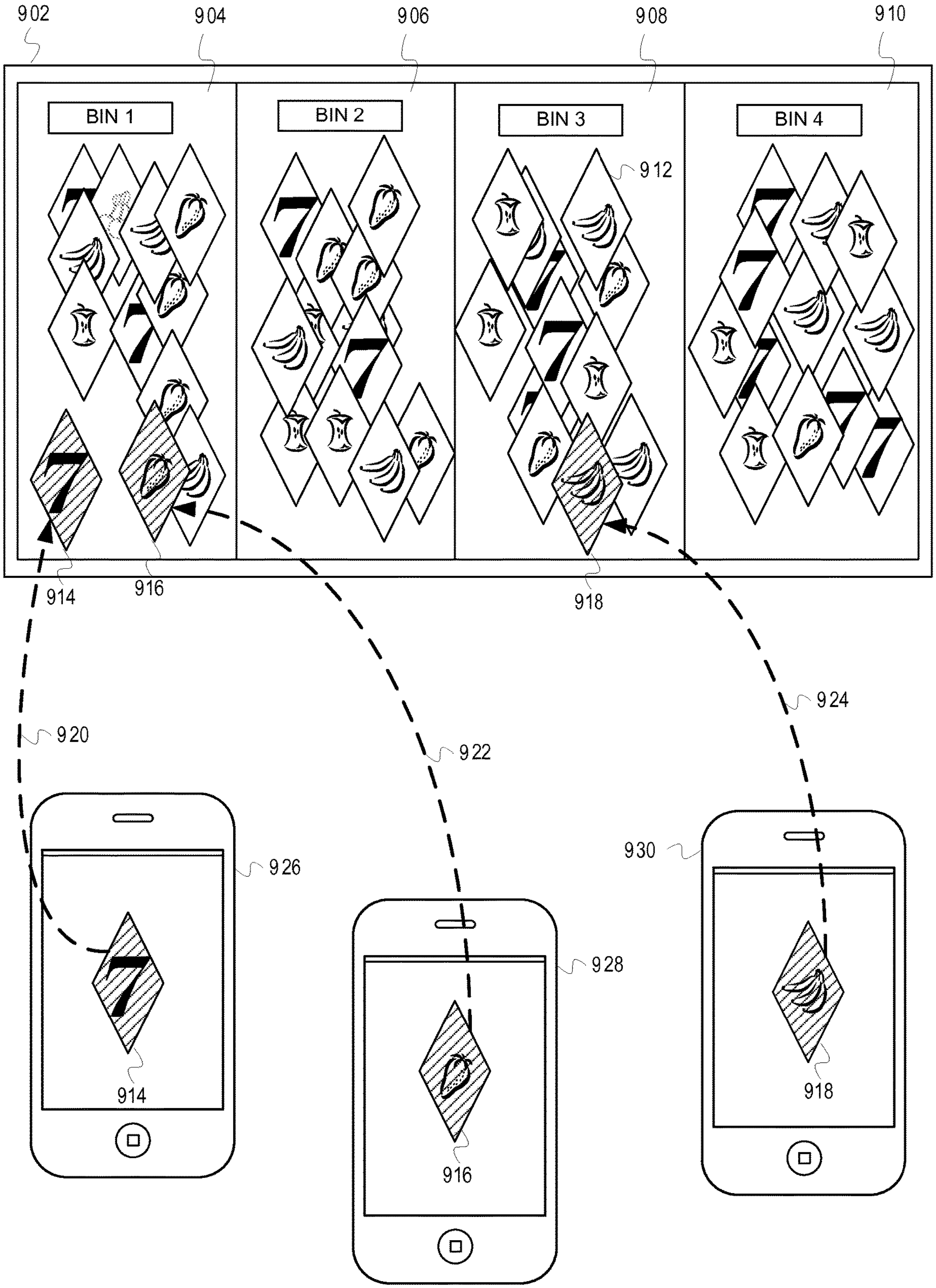
FIG. 9 depicts playing a community wagering game via a mobile device 926.

FIG. 9 depicts playing a community wagering game via a mobile device 926. In some embodiments, players can use gestures (such as those described herein) to participate in community wagering games. An example community wagering game is depicted in FIG. 9. The community wagering game depicted in FIG. 9 includes a community display device 902, having four "bins" 904, 906, 908, and 910. The object of the community wagering game is to place wagering game objects 912 in the bins 904, 906, 908, and 910. Then, when a bin becomes full, a predetermined time period has passed, etc., the last player to place a wagering game object 912 in the bin 904, 906, 908, and 910 is awarded a prize. As depicted in FIG. 9, three players are using mobile devices 926, 928, and 930 to partake in the community wagering game. The first player is performing a gesture on their mobile device 926 to "toss" the wagering game object 914 in the first bin 904, as indicated by arrow 920. The second player is performing a gesture on their mobile device 928 to "toss" the wagering game object 916 into the first bin 904, as indicated by arrow 922. The third player is performing a gesture on their mobile device 930 to "toss" the wagering game object 918 into the third bin 908 as indicated by arrow 924. For example, the players can select the wagering game object and slide it across the mobile device's touchscreen toward the community display device 902, press and hold the wagering game object, drag the wagering game object to a designated area on the mobile device's touchscreen, etc., to "toss" the wagering game object into a bin.

In some embodiments, players can earn bonus triggers by playing a base wagering game. The players can then use these bonus triggers to play community wagering games, such as the community wagering game depicted in FIG. 9. Each bonus trigger can be weighted differently. For example, a "Lucky Number 7" bonus trigger may occur with a lesser frequency than a "Strawberry" bonus trigger. Consequently, the "Lucky Number 7" bonus trigger can have a greater relative worth than the "Strawberry" bonus trigger. Furthermore, the community wagering game described in FIG. 9 is provided only as an example. The ideas described in the discussion of FIG. 9 are applicable to any suitable community wagering game.

Figure 10:
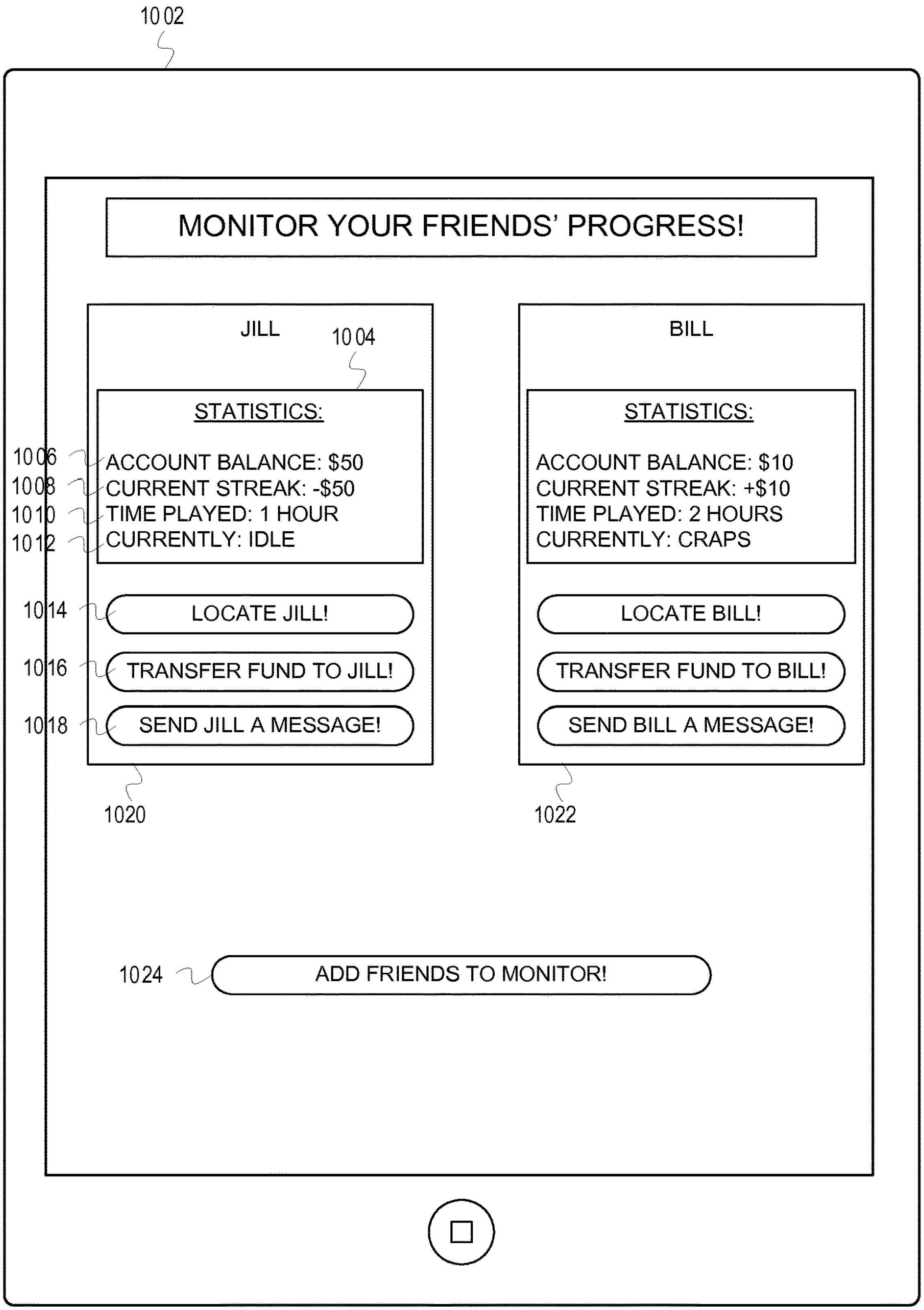
FIG. 10 depicts monitoring of friends' progress via a mobile device 1002.

While FIGS. 4-9 describe transferring wagering game objects between a mobile device and a wagering game machine, FIG. 10 describes monitoring and tracking of player progress via a mobile device.

FIG. 10 depicts monitoring of friends' progress via a mobile device 1002. In some embodiments, players can monitor, via the mobile device 1002, their friends' or social contacts' progress as their friends and social contacts play wagering games. In some embodiments, the mobile device 1002 can present information boxes 1020 and 1022 containing information about a player's friends' progress. As depicted in FIG. 10, the player is monitoring Jill's progress and Bill's progress. The mobile device 1002 is presenting information relating to Jill's current account balance 1006, Jill's current winning/losing streak 1008, Jill's gameplay duration 1010, and Jill's current activity 1012. As depicted, Jill has a current account balance of $50, has a current losing streak of $50, has been playing wagering games for 1 hour, and is not currently playing a wagering game. Additionally, the player can locate Jill using a locate button 1014, transfer funds to Jill's account using a transfer funds button 1016, and send Jill a message using a messaging button 1018. In some embodiments, when the locate button 1014 is selected, the mobile device 1002 presents a map of the casino floor with an indicator of Jill's location within the casino. Additionally, the player can add more friends to monitor using an add friends button 1024. In some embodiments, the mobile device 1002 can present more or less information than described above. For example, the mobile device 1002 can present information regarding friends' demographics, wagering games that friends have recently played, friends' favorite wagering games, friends' biggest wins, friends' biggest losses, friends' other social contacts, etc.

Operating Environment

This section describes an example operating environment and presents structural aspects of some embodiments. This section includes discussion about wagering game machine architectures, wagering game networks, and wagering games.

Wagering Game Machine Architectures

Figure 11:
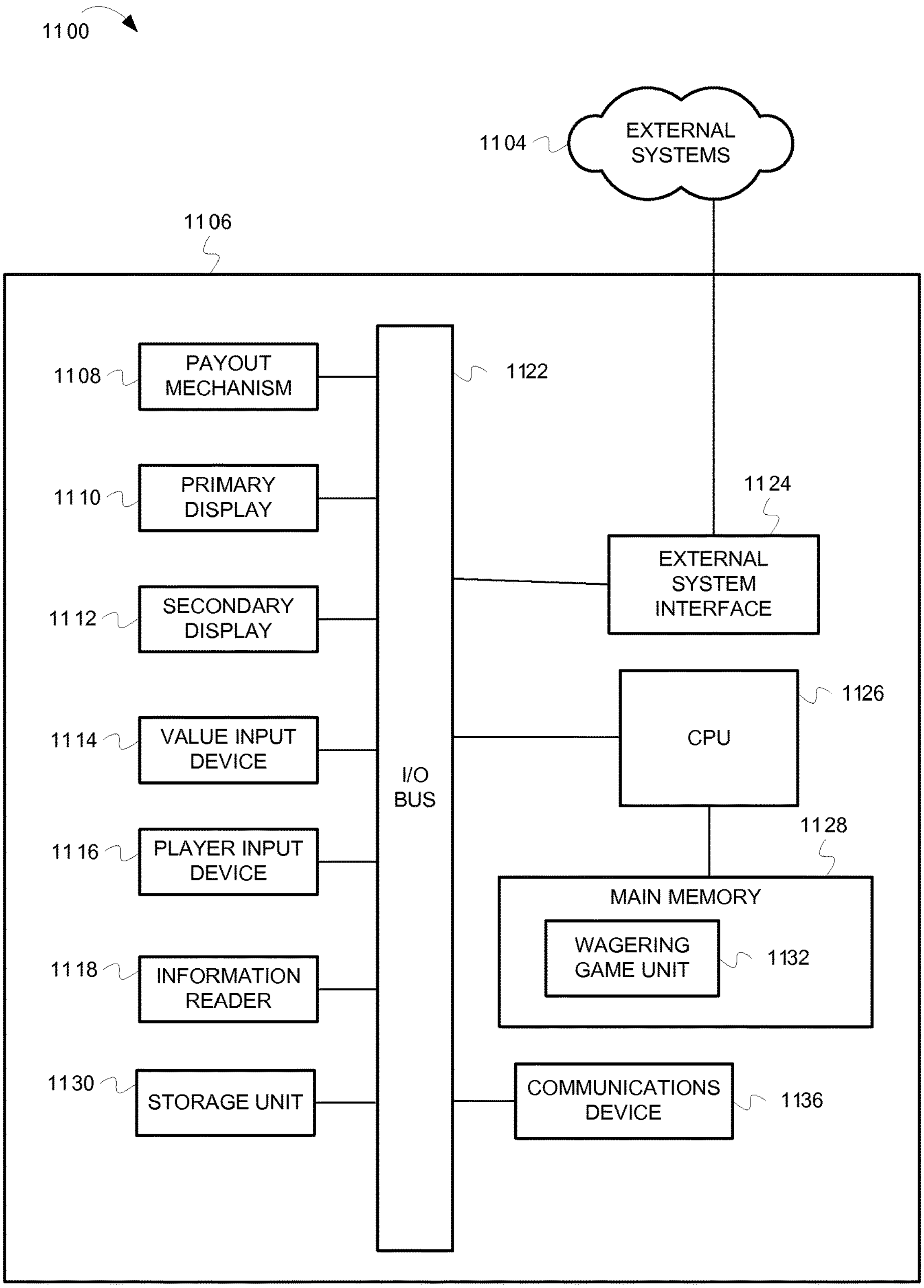
FIG. 11 is a block diagram illustrating a wagering game machine architecture, according to example embodiments of the invention.

FIG. 11 is a block diagram illustrating a wagering game machine architecture, according to example embodiments of the invention. As shown in FIG. 11, the wagering game machine architecture 1100 includes a wagering game machine 1106, which includes a central processing unit (CPU) 1126 connected to main memory 1128. The CPU 1126 can include any suitable processor, such as an Intel® Pentium processor, Intel® Core 2 Duo processor, AMD Opteron™ processor, or UltraSPARC processor. The main memory 1128 includes a wagering game unit 1132. In one embodiment, the wagering game unit 1132 can present wagering games, such as video poker, video black jack, video slots, video lottery, etc., in whole or part.

The CPU 1126 is also connected to an input/output (I/O) bus 1122, which can include any suitable bus technologies, such as an AGTL+ frontside bus and a PCI backside bus. The I/O bus 1122 is connected to a payout mechanism 1108, primary display 1110, secondary display 1112, value input device 1114, player input device 1116, information reader 1118, storage unit 1130, and communications device 1136. The communications device 1136 can communicate with mobile devices, other wagering game machines, etc., as described herein to facilitate the transfer of wagering game objects. The player input device 1116 can include the value input device 1114 to the extent the player input device 1116 is used to place wagers. The I/O bus 1122 is also connected to an external system interface 1124, which is connected to external systems 1104 (e.g., wagering game networks).

In one embodiment, the wagering game machine 1106 can include additional peripheral devices and/or more than one of each component shown in FIG. 11. For example, in one embodiment, the wagering game machine 1106 can include multiple external system interfaces 1124 and/or multiple CPUs 1126. In one embodiment, any of the components can be integrated or subdivided.

Any component of the architecture 1100 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Any component of the architecture 1100 can include hardware, firmware, and/or machine-readable media including instructions for performing the operations described herein. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

While FIG. 11 describes an example wagering game machine architecture, this section continues with a discussion wagering game networks.

Wagering Game Networks

Figure 12:
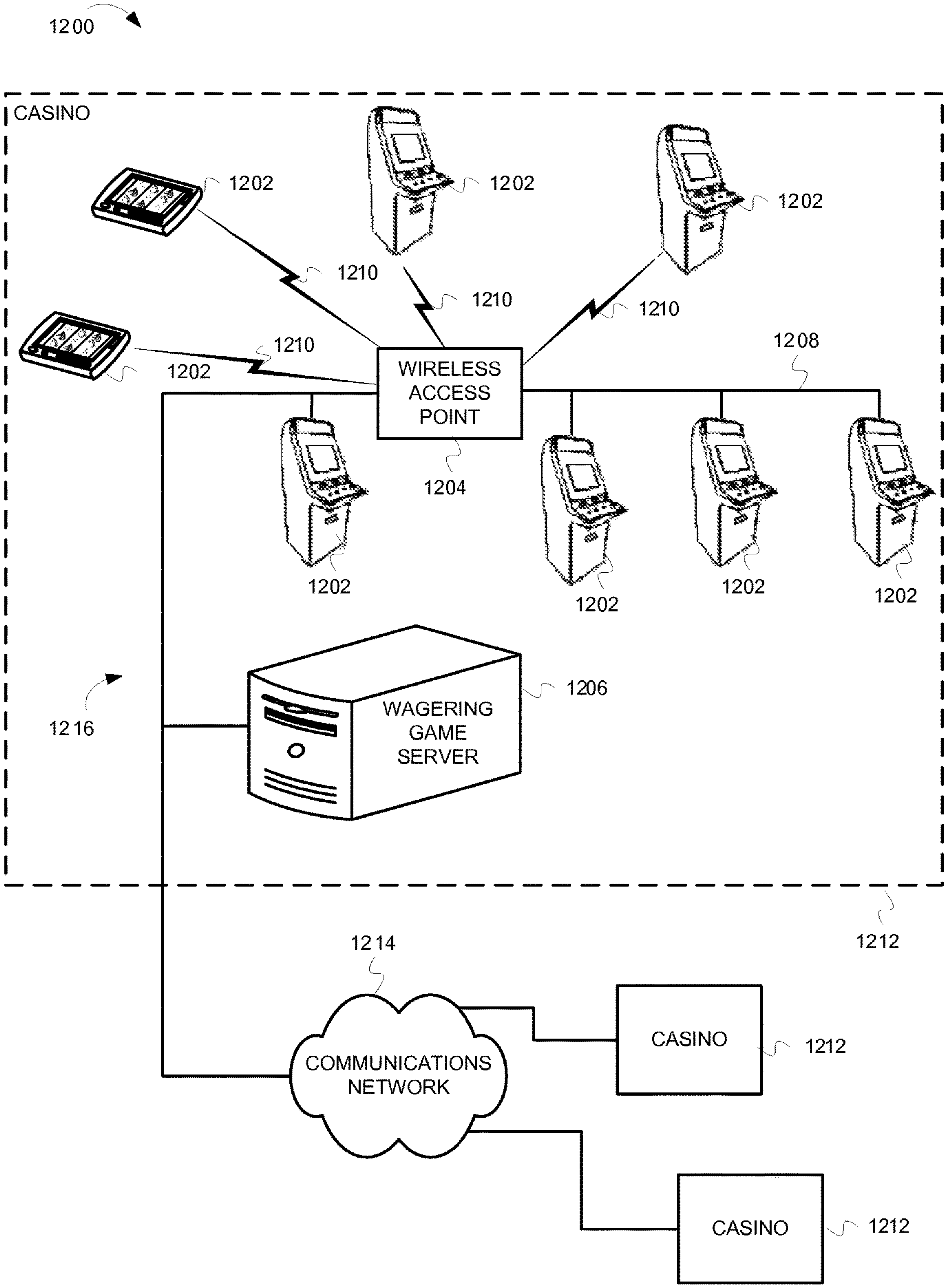
FIG. 12 is a block diagram illustrating a wagering game network 1200, according to example embodiments of the invention.

FIG. 12 is a block diagram illustrating a wagering game network 1200, according to example embodiments of the invention. As shown in FIG. 12, the wagering game network 1200 includes a plurality of casinos 1212 connected to a communications network 1214.

Each casino 1212 includes a local area network 1216, which includes an access point 1204, a wagering game server 1206, and wagering game machines 1202. The access point 1204 provides wireless communication links 1210 and wired communication links 1208. The wired and wireless communication links can employ any suitable connection technology, such as Bluetooth, 802.11, Ethernet, public switched telephone networks, SONET, etc. In some embodiments, the wagering game server 1206 can serve wagering games and distribute content to devices located in other casinos 1212 or at other locations on the communications network 1214.

The wagering game machines 1202 described herein can take any suitable form, such as floor standing models, handheld mobile units, bartop models, workstation-type console models, etc. Further, the wagering game machines 1202 can be primarily dedicated for use in conducting wagering games, or can include non-dedicated devices, such as mobile phones, personal digital assistants, personal computers, etc. In one embodiment, the wagering game network 1200 can include other network devices, such as accounting servers, wide area progressive servers, player tracking servers, and/or other devices suitable for use in connection with embodiments of the invention.

In some embodiments, wagering game machines 1202 and wagering game servers 1206 work together such that a wagering game machine 1202 can be operated as a thin, thick, or intermediate client. For example, one or more elements of game play may be controlled by the wagering game machine 1202 (client) or the wagering game server 1206 (server). Game play elements can include executable game code, lookup tables, configuration files, game outcome, audio or visual representations of the game, game assets or the like. In a thin-client example, the wagering game server 1206 can perform functions such as determining game outcome or managing assets, while the wagering game machine 1202 can present a graphical representation of such outcome or asset modification to the user (e.g., player). In a thick-client example, the wagering game machines 1202 can determine game outcomes and communicate the outcomes to the wagering game server 1206 for recording or managing a player's account.

In some embodiments, either the wagering game machines 1202 (client) or the wagering game server 1206 can provide functionality that is not directly related to game play. For example, account transactions and account rules may be managed centrally (e.g., by the wagering game server 1206) or locally (e.g., by the wagering game machine 1202). Other functionality not directly related to game play may include power management, presentation of advertising, software or firmware updates, system quality or security checks, etc.

Any of the wagering game network components (e.g., the wagering game machines 1202) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

presenting, on a mobile device, a graphical user interface configured to receive user input;

determining that the mobile device is in a first orientation, wherein in the first orientation a surface of a display device of the mobile device is in a plane parallel to that of a surface of a second device;

detecting, via the graphical user interface, a first gesture that indicates bets for a wagering game based on the mobile device being in the first orientation, wherein the detecting the first gesture includes detecting a player's hand moving while in contact with the display device of which the graphical user interface appears;

determining that the mobile device is in a second orientation different from the first orientation, wherein in the second orientation the surface of the display device is in a plane normal to that of the surface of the second device;

detecting, via the graphical user interface, a second gesture that initiates transfer of an indication of the bets to the second device based on the mobile device being in the second orientation, wherein the detecting the second gesture includes detecting the player's hand moving while in contact with a display device of which the graphical user interface appears;

transmitting, via a network in response to the second gesture, the indication of the bets from the mobile device to the second device; and after the transmitting, presenting a graphical indication of the bets on the second device.

2. The method of claim 1, wherein the second device is a wagering game machine.

3. The method of claim 1, further comprising:

receiving, as the first gesture via the graphical user interface, user input to save the bets for the wagering game as default bets;

saving the bets for the wagering game as the default bets prior to wagering game play;

initiating, via the second gesture, transferring of an indication of the default bets from the mobile device to the second device during wagering game play; and placing the default bets for the wagering game via electronic access to monetary value from a player account associated with the mobile device.

4. The method of claim 1, wherein the indication of the bets for the wagering game includes one or more of a bet amount, a bet placement, a bet frequency, and a bet recurrence.

5. The method of claim 1, wherein the detecting the first gesture comprises detecting that a finger of the player's hand moves in a first direction across a surface of the display device and wherein the detecting the second gesture comprises detecting that the finger of the player's hand moves in a second direction different from the first direction.

6. One or more non-transitory computer readable storage media, having instructions stored therein, which, when executed by one or more processors, causes the one or more processors to perform operations for processing gestures, the instructions comprising instructions to present, on a display device of a mobile device, a graphical user interface configured to receive user input;

instructions to determine that the mobile device is in a first orientation, wherein in the first orientation a surface of the display device is in a plane parallel to that of a surface of a second device;

instructions to detect, via the graphical user interface, a first gesture that indicates bets for a wagering game based on the mobile device being in the first orientation, wherein the detecting the first gesture includes detecting a player's hand moving while in contact with the display device of which the graphical user interface appears;

instructions to determine that the mobile device is in a second orientation different from the first orientation, wherein in the second orientation the surface of the display device is in a plane normal to that of the surface of the second device;

instructions to detect, via the graphical user interface, a second gesture that initiates transfer of an indication of the bets to the second device based on the mobile device being in the second orientation, wherein the detecting the second gesture includes detecting the player's hand moving while in contact with a display device of which the graphical user interface appears;

instructions to transmit, via a network in response to the second gesture, the indication of the bets to the second device; and instructions to, after the transmission, present a graphical indication of the bets on the second device.

7. The one or more computer readable storage media of claim 6, wherein the second device is a wagering game machine.

8. The one or more computer readable storage media of claim 6, wherein the wagering game is presented on a gaming table and wherein the second device is a wagering game server.

9. The one or more computer readable storage media of claim 6, the instructions further comprising:

instructions to receive, via the graphical user interface, user input to save the bets for the wagering game as one or more default bets; and instructions to save the bets for the wagering game as the one or more default bets.

10. The one or more computer readable storage media of claim 6, wherein the indication of the bets for the wagering game includes one or more of a bet amount, a bet placement, a bet frequency, and a bet recurrence.

* * * * *